(12) United States Patent
Xiao et al.

(10) Patent No.: US 12,391,551 B2
(45) Date of Patent: Aug. 19, 2025

(54) HOMOLOGOUS HETEROSTRUCTURE FeSe ELECTRODE MATERIAL WITH HIGH TAP DENSITY AND PREPARATION METHOD THEREOF

(71) Applicant: BEIJING UNIVERSITY OF CHEMICAL TECHNOLOGY, Beijing (CN)

(72) Inventors: Ying Xiao, Beijing (CN); Yue Miao, Beijing (CN); Fenglian Gong, Beijing (CN); Shilin Hu, Beijing (CN); Shimou Chen, Beijing (CN)

(73) Assignee: BEIJING UNIVERSITY OF CHEMICAL TECHNOLOGY CHINA (CN)

( * ) Notice: Subject to any disclaimer, the term of this patent is extended or adjusted under 35 U.S.C. 154(b) by 0 days.

(21) Appl. No.: 18/603,247

(22) Filed: Mar. 13, 2024

(65) Prior Publication Data

US 2025/0145463 A1 May 8, 2025

(30) Foreign Application Priority Data

Nov. 2, 2023 (CN) .......................... 202311446496.0

(51) Int. Cl.
*C01B 19/00* (2006.01)

(52) U.S. Cl.
CPC ........ *C01B 19/007* (2013.01); *C01P 2002/30* (2013.01); *C01P 2002/72* (2013.01);
(Continued)

(58) Field of Classification Search
CPC ............... C01B 19/007; C01P 2002/30; C01P 2002/72; C01P 2004/03; C01P 2004/61; C01P 2006/11; C01P 2006/40
See application file for complete search history.

(56) References Cited

FOREIGN PATENT DOCUMENTS

| CN | 108467271 A | 8/2018 | |
|---|---|---|---|
| CN | 108467271 B | * 3/2021 | ........... C04B 35/547 |

(Continued)

OTHER PUBLICATIONS

Zhang et al., Polymorph Engineering for Boosted Volumetric Na—Ion and Li—Ion Storage, 2021, Adv. Mater., 33, 2100210 (Year: 2021).*

*Primary Examiner* — Daniel S Gatewood (57) ABSTRACT

This invention introduces a homologous heterostructure FeSe electrode material with exceptional tap density and its preparation method, situated within a specific technical domain. The material comprises a unique homo-heterostructure of tetragonal t-FeSe and hexagonal h-FeSe, boasting a tap density of 2.57 cm3g-1. It is synthesized by uniformly mixing iron and selenium powders, followed by heating in a tube furnace. This carbon-free, homologous heterogeneous crystalline FeSe, designed as a sodium-ion battery anode, demonstrates notable structural stability and superior rate performance. The invention enhances charge transfer efficiency through charge redistribution and lattice distortion at the phase boundary, facilitates metal ion transport, and introduces extra active sites for reversible redox reactions. These features significantly boost the material's ion transport kinetics and storage capacity, leading to remarkable long-cycle and high-rate performance.

2 Claims, 10 Drawing Sheets

(52) U.S. Cl.
CPC ...... *C01P 2004/03* (2013.01); *C01P 2004/61* (2013.01); *C01P 2006/11* (2013.01); *C01P 2006/40* (2013.01)

(56) References Cited

FOREIGN PATENT DOCUMENTS

| CN | 112786853 A | * | 5/2021 | ............ | B82Y 30/00 |
| CN | 116979047 A | * | 10/2023 | | |

* cited by examiner

HOMOLOGOUS HETEROSTRUCTURE FeSe ELECTRODE MATERIAL WITH HIGH TAP DENSITY AND PREPARATION METHOD THEREOF

TECHNICAL FIELD

The invention belongs to the technical field of electrode materials for sodium-ion batteries, and specifically relates to a homologous heterostructure FeSe electrode material with a high tap density and a preparation method thereof.

BACKGROUND ART

Compared with traditional lithium-ion batteries, sodium-ion batteries have the advantages of abundant resources, low cost and high safety, and have great application prospects in the field of large-scale energy storage. However, due to the large radius of $Na^+$, the electrochemical reaction kinetics is slow, and the large radius leads to the huge stress and strain of the electrode material during the repeated charge and discharge process, resulting in particle crushing and shortening the battery life.

At present, the commonly used improvement strategies involve the combination of carbon components. However, the steps are cumbersome and the tap density of the electrode material is low, resulting in low battery volume capacity and energy density, which is not conducive to the practical application. These strategies mainly focus on external charge transfer, severe electrode polarization, and slow $Na^+$ diffusion kinetics, which are still the key obstacles to achieving high-performance SIB. In addition, the presence of the carbon component will reduce the tap density of the electrode material and subsequently reduce the volume capacity and energy density of the battery. For example, FeSe@CNS obtained by hydrothermal and subsequent heat treatment, although the carbon shell plays a crucial role in stabilizing the Fe/Na2Se interface produced in the electrochemical reaction, it is still difficult to achieve a satisfactory capacity density.

Therefore, it is very important to develop an effective strategy to prepare a high tap density and high-capacity electrode material and apply it to long cycle life sodium-ion batteries, which is very important to promote the practical application of sodium-ion batteries.

SUMMARY

The purpose of the invention is to overcome the problems existing in the existing technology, a homologous heterostructure FeSe electrode material with a high tap density and a preparation method thereof are provided, which use the homologous heterostructure construction strategy to improve the strain resistance of the material, thereby preparing a high-capacity electrode material with good structural stability. At the same time, the material preparation process is simple and the tap density is high, which provides a new idea for the design and synthesis of high-efficiency electrode materials and the development of high-volume capacity batteries.

In order to achieve the above purpose, the invention adopts the following technical solution: A homologous heterostructure FeSe electrode material with a high tap density, the FeSe electrode material contains a homologous heterostructure composed of tetragonal crystal phase t-FeSe and hexagonal crystal phase h-FeSe.

The invention also provides a preparation method for the FeSe electrode material with a high tap density and homologous heterostructure, including the following steps:

S1, mixing an iron powder and a selenium powder with an agate mortar, and a mass ratio of iron powder and selenium powder is 1-2:1-3, and obtaining a dark brown mixed powder;

S2, placing the dark brown mixed powder in a tube furnace, and then carrying out a heating reduction in a reducing atmosphere, a calcination temperature is 700° C. and a holding time is 2 h, obtaining a FeSe material with a homologous heterostructure.

In S1, a particle size of iron powder and selenium powder after mixing with the agate mortar is 20-100 μm.

In S2, the reducing atmosphere is $H_2$ or Ar.

In S2, an initial temperature is 25° C. and a heating rate is 5° C./min.

The beneficial effects of the invention are as follows:

1) In the preparation method of this invention, the homologous heterostructure construction strategy is used to improve the strain resistance of the material, thereby preparing a high-capacity electrode material with good structural stability. At the same time, the material preparation step is simple and the tap density is high, which provides a new idea for the design and synthesis of high-efficiency electrode materials and the development of high-volume capacity batteries.

2) The homologous heterostructure FeSe electrode material with a high tap density prepared by the invention has superior electrochemical performance, the experimental results show that the electrode has good electrochemical performance, and the initial Coulombic efficiency is as high as 94.1%; at a high current density of 5 A $g^{-1}$, it can be stably cycled for 4000 times, and the performance is even better than the existing carbon-coated selenide electrode materials.

3) The FeSe electrode material prepared by the invention is a homologous heterostructure, which not only has the attractive advantages of accelerating ion diffusion kinetics, enhancing conductivity, and optimizing ion adsorption endowed by the built-in electric field effect but also has better interface good coupling and better lattice matching, effectively alleviating the volume strain of the conversion mechanism electrode material FeSe and ensuring the structural stability of the electrode material during repeated charge and discharge.

Therefore, in the absence of carbon components, the prepared homologous heterostructure FeSe sodium storage anode with a high tap density exhibits excellent structural stability habit, and the assembled battery exhibits excellent comprehensive electrochemical performance such as high rate and long cycle.

4) The preparation method used in the invention is simple, low cost, and easy to mass production; the prepared electrode material does not contain carbon, which effectively improves the tap density of the electrode material and the energy density of the battery.

DETAILED DESCRIPTION OF THE EMBODIMENTS

The following is a further explanation of the invention in combination with the attached drawings and specific embodiments.

Embodiment 1: The iron powder and selenium powder are ground and mixed, the mixed powder is placed in the middle of the tube furnace, the mass ratio of iron powder to selenium powder is 1:2, the calcination treatment is carried out in $H_2$/Ar atmosphere, the initial temperature is 25° C., the heating rate is 5° C./min, and the calcination temperature is increased to 700° C., after 2 hours of heat preservation, the carbon-free FeSe electrode material with a homologous heterostructure is finally prepared.

Figure 1:
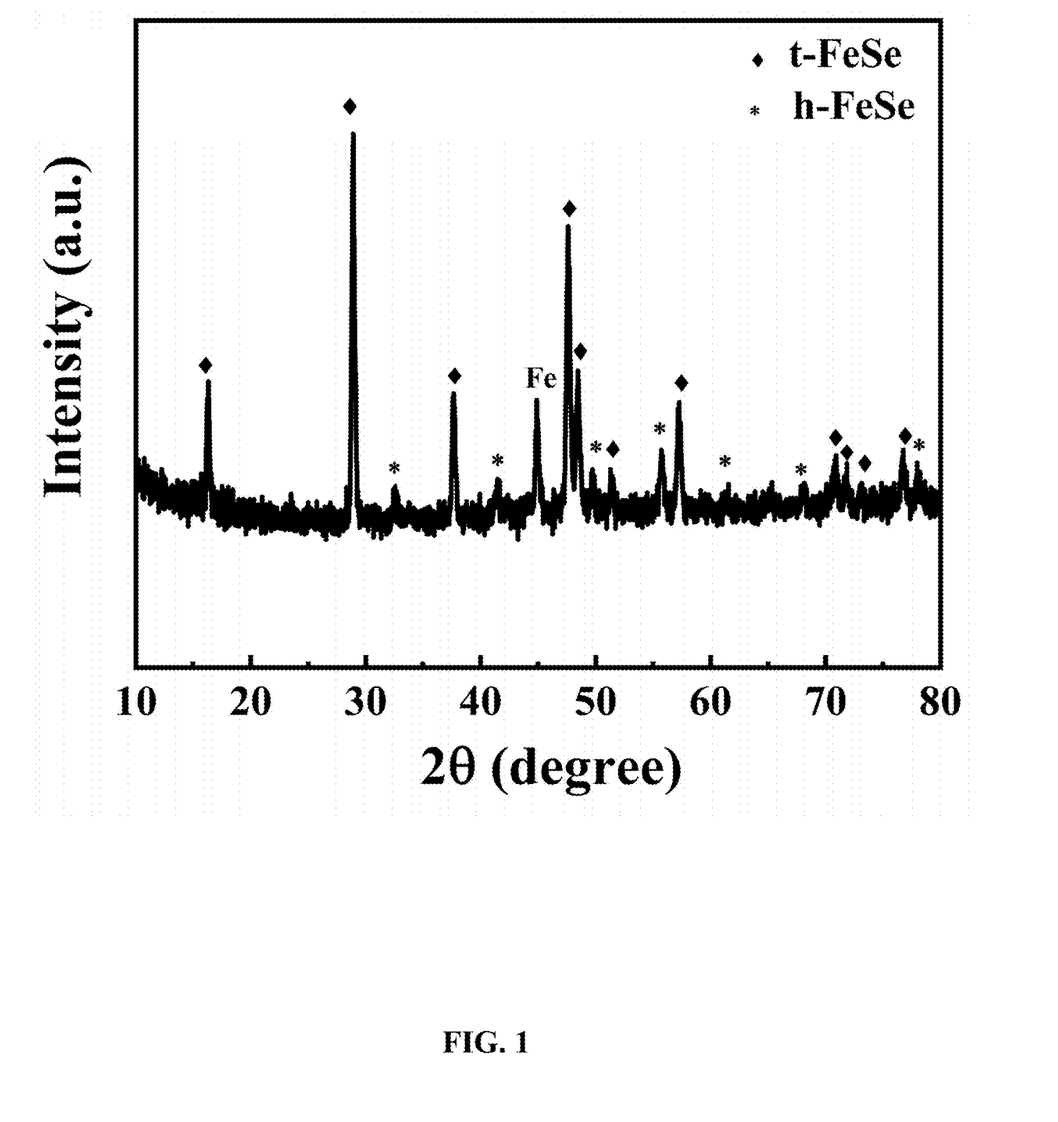
FIG. 1 is an XRD diagram of the sample prepared in the Embodiment 1 of the invention.

FIG. 1 is an XRD diagram of the sample prepared by Embodiment 1. It can be seen from the diagram that the sample is composed of a tetragonal crystal phase (t-FeSe) and a hexagonal crystal phase (h-FeSe), among which the content of the tetragonal crystal phase is higher and contains the Fe impurity phase.

Embodiment 2: The iron powder and selenium powder are ground and mixed at a ratio of 1:1, the mixed powder is placed in the middle of the tube furnace and calcined in $H_2$/Ar atmosphere, the initial temperature is 25° C. and the heating rate is 5° C./min, and the calcination temperature is increased to 700° C., after 2 hours of heat preservation, the carbon-free FeSe electrode material with a homologous heterostructure is finally prepared.

Figure 2:
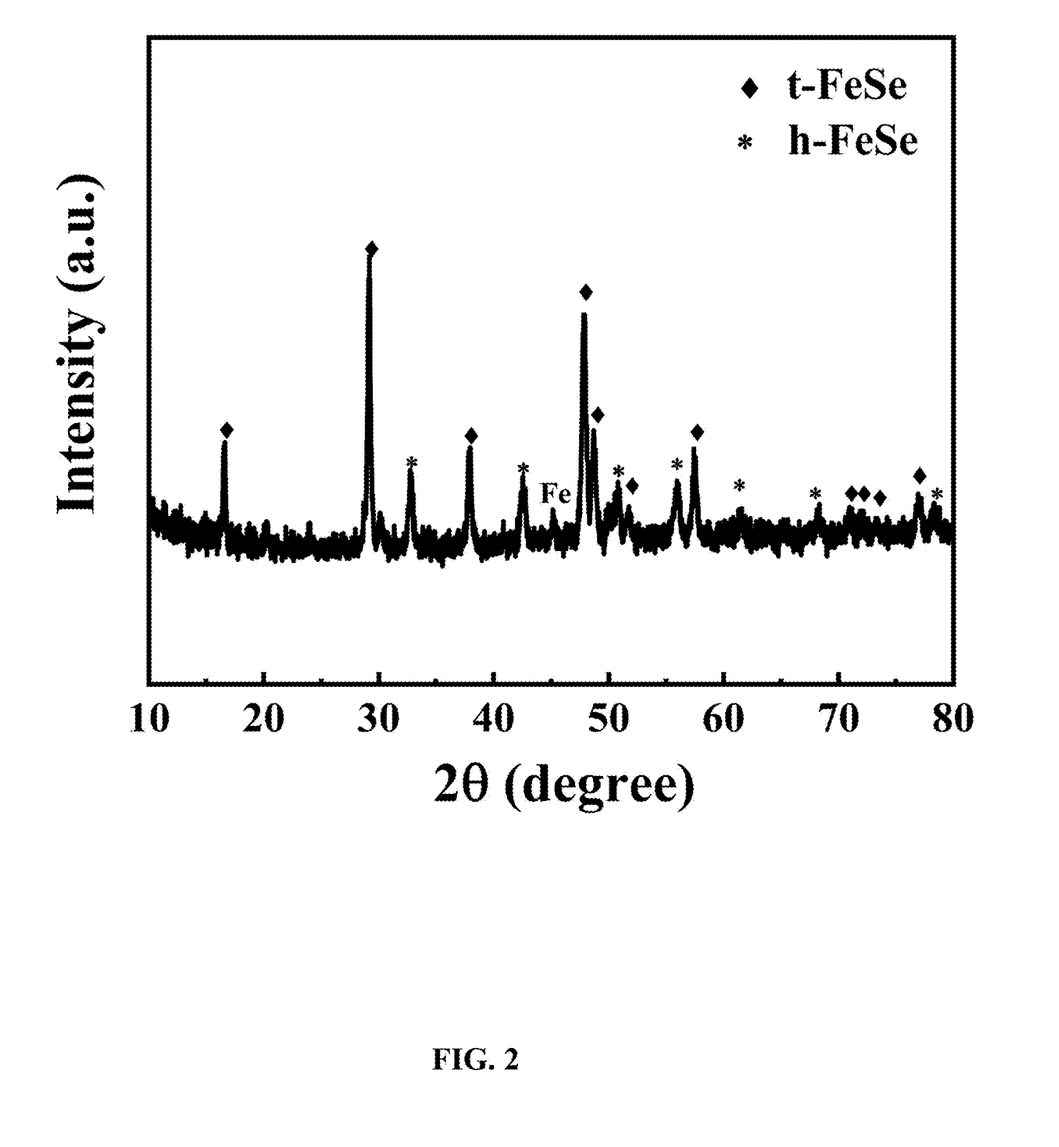
FIG. 2 is an XRD diagram of the sample prepared in the Embodiment 2 of the invention.

FIG. 2 is an XRD diagram of the sample prepared in Embodiment 2. It can be seen that the sample is composed of t-FeSe and h-FeSe, and contains Fe impurity phase.

Embodiment 3: The iron powder and selenium powder are ground and mixed at a ratio of 2:1, the mixed powder is placed in the middle of the tube furnace and calcined in $H_2$/Ar atmosphere, the initial temperature is 25° C. and the heating rate is 5° C./min, and the calcination temperature is increased to 700° C., after 2 hours of heat preservation, the carbon-free FeSe electrode material with a homologous heterostructure is finally prepared.

Figure 3:
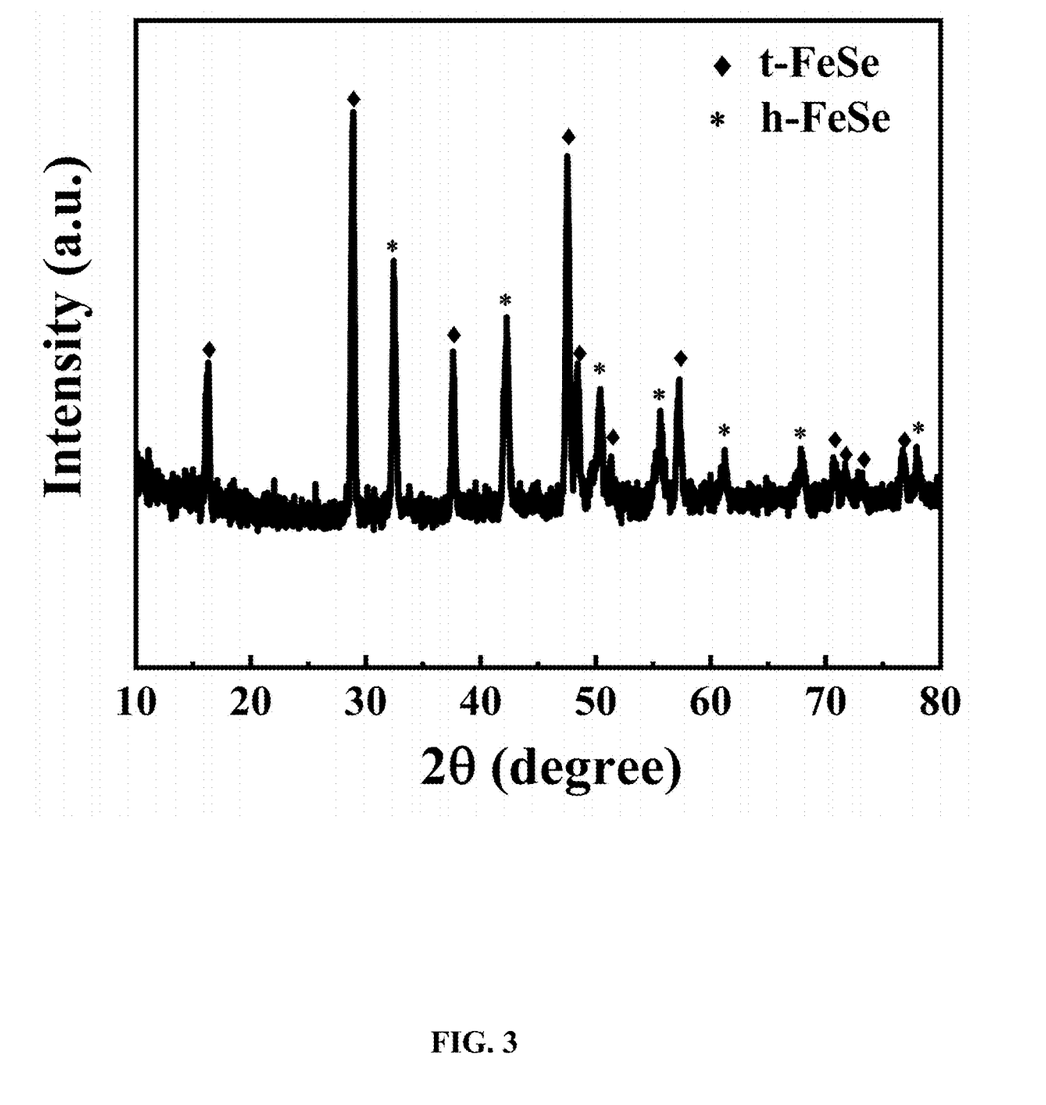
FIG. 3 is an XRD diagram of the sample prepared in the Embodiment 3 of the invention.

FIG. 3 is an XRD diagram of the sample prepared by Embodiment 3, it can be seen from the diagram that the sample is composed of t-FeSe and h-FeSe, and no impurity peak appears.

Figure 4:
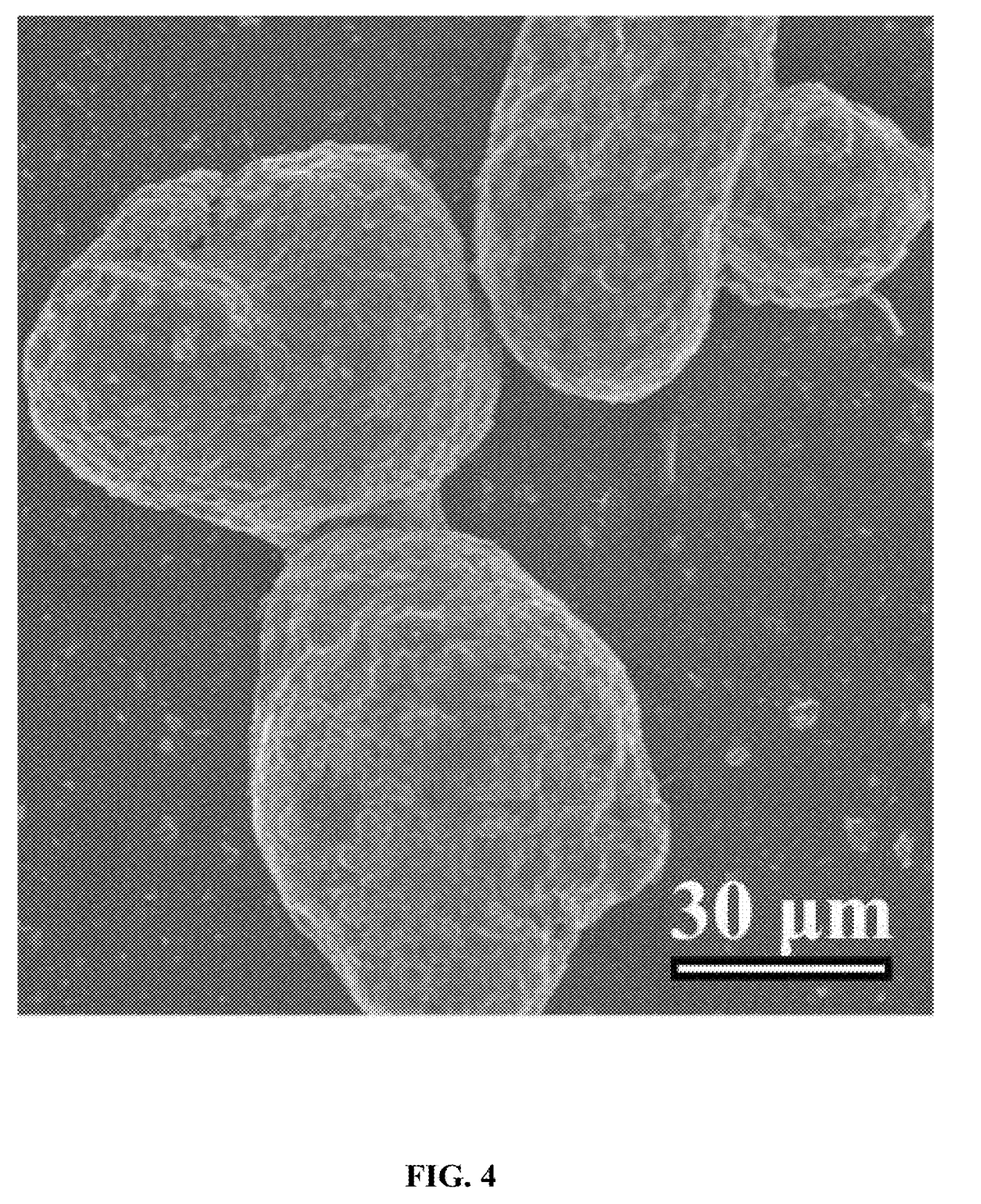
FIG. 4 is an SEM diagram of the sample prepared in Embodiment 3 of the invention.

FIG. 4 is an SEM diagram of the sample prepared in Embodiment 3, it can be seen from the diagram that the prepared sample is a dense block structure with no pores, the tap density is as high as 2.57 $cm^3 g^{-1}$.

Embodiment 4: The iron powder and selenium powder are ground and mixed at a ratio of 1:3, the mixed powder is placed in the middle of the tube furnace and calcined in $H_2$/Ar atmosphere, the initial temperature is 25° C. and the heating rate is 5° C./min, and the calcination temperature is increased to 700° C., after 2 hours of heat preservation, the carbon-free FeSe electrode material with a homologous heterostructure is finally prepared.

Figure 5:
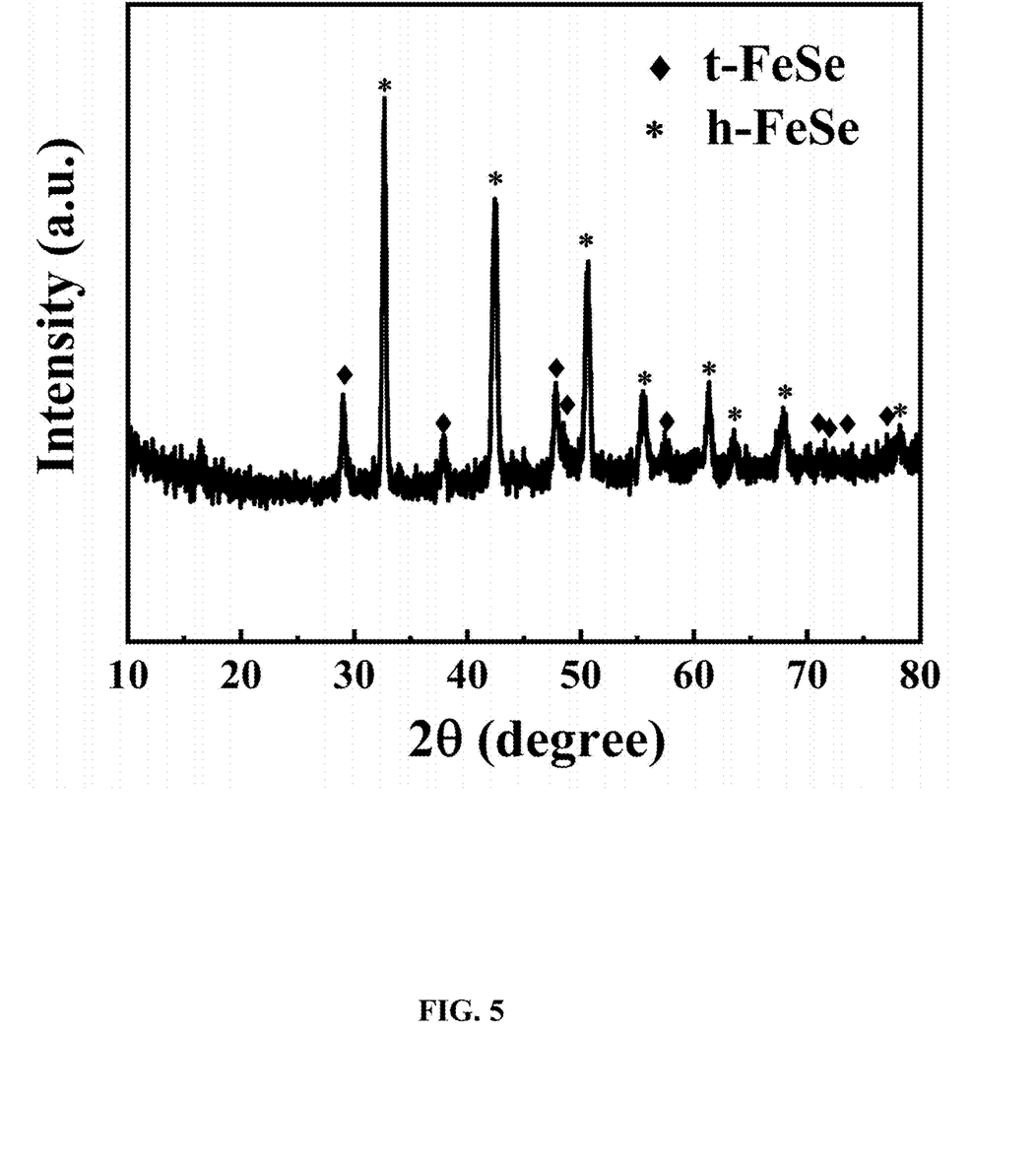
FIG. 5 is an XRD diagram of the sample prepared in Embodiment 4 of the invention.

FIG. 5 is an XRD diagram of the sample prepared by Embodiment 4, it can be seen from the diagram that the sample is composed of t-FeSe and h-FeSe, and the hexagonal crystal phase content is higher.

Based on the above experimental results, and in view of the good crystallinity and high purity of the samples prepared by Embodiment 3, the control tests of the subsequent related properties are carried out with Embodiment 3 as an example.

Comparative example 1: The iron powder and selenium powder are ground and mixed at a ratio of 3:1, the mixed powder is placed in the middle of the tube furnace and calcined in $H_2$/Ar atmosphere, the initial temperature is 25° C. and the heating rate is 5° C./min, and the calcination temperature is increased to 700° C., after 2 hours of heat preservation, the t-FeSe-based electrode material is finally prepared.

Figure 6:
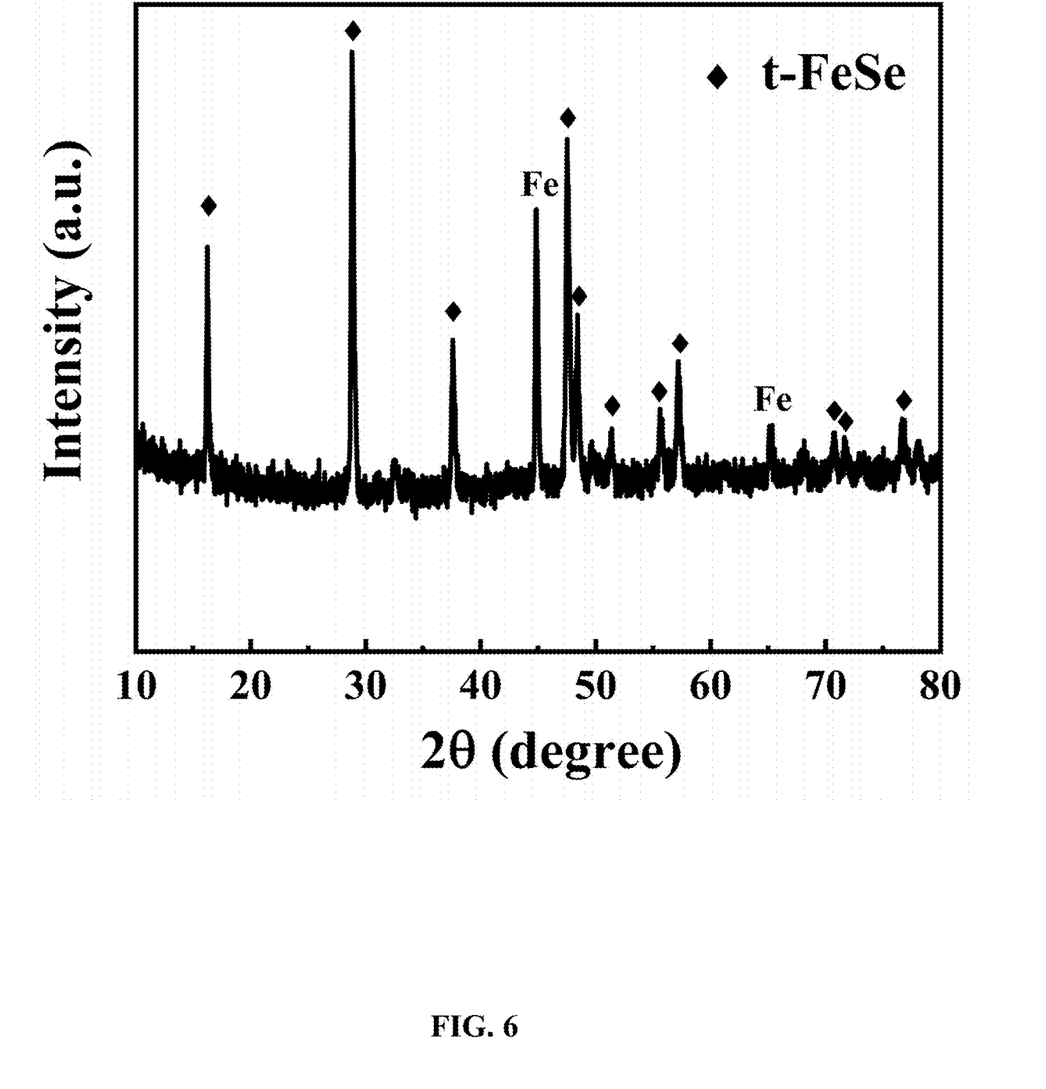
FIG. 6 is an XRD diagram of the sample prepared in Comparative example 1 of the invention.

FIG. 6 shows the XRD diagram of the sample prepared by the ratio of 1, and it can be seen that the sample is composed of t-FeSe and Fe.

Comparative example 2: The iron powder and selenium powder were mixed at a ratio of 1:4. The mixed powder was placed in the middle of the tube furnace and calcined in $H_2$/Ar atmosphere, the initial temperature is 25° C. and the heating rate is 5° C./min. After heating to the calcination temperature of 700° C., and then holding for 2 h, the h-FeSe-based electrode material was finally prepared.

Figure 7:
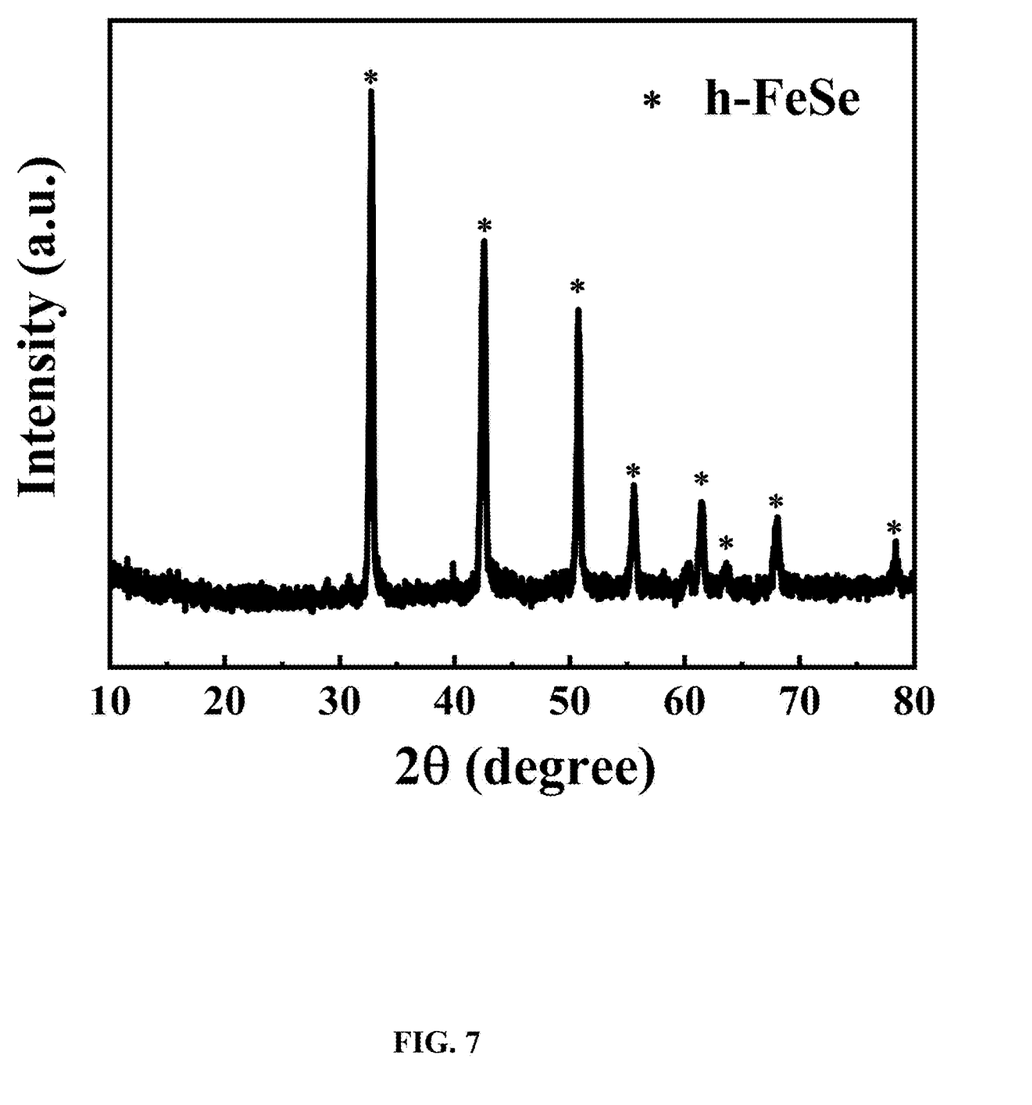
FIG. 7 is an XRD diagram of the sample prepared in Comparative example 2 of the invention.

FIG. 7 is an XRD diagram of the sample prepared by Comparative example 2, from which the h-FeSe composition of the sample can be seen.

Electrochemical performance test: In order to prove the effective regulation of the stability of the FeSe electrode material by the homologous heterostructure, Embodiment 3 and Comparative example 2 are selected to test the electrochemical performance.

1. Preparation of Electrode Materials

The samples of Embodiment 3 and Comparative example 2 are used as active materials, carbon nanotubes are used as conductive agents, sodium carboxymethyl cellulose is used as a binder, water is used as a solvent, those components are ground into paste and uniformly coated on the copper foil current collector. After vacuum drying, it is used as the negative electrode of the sodium battery and assembled with sodium metal and organic liquid electrolyte into a sodium ion half-cell to test the cycle performance of the battery.

2. Battery Test Results

Figure 8:
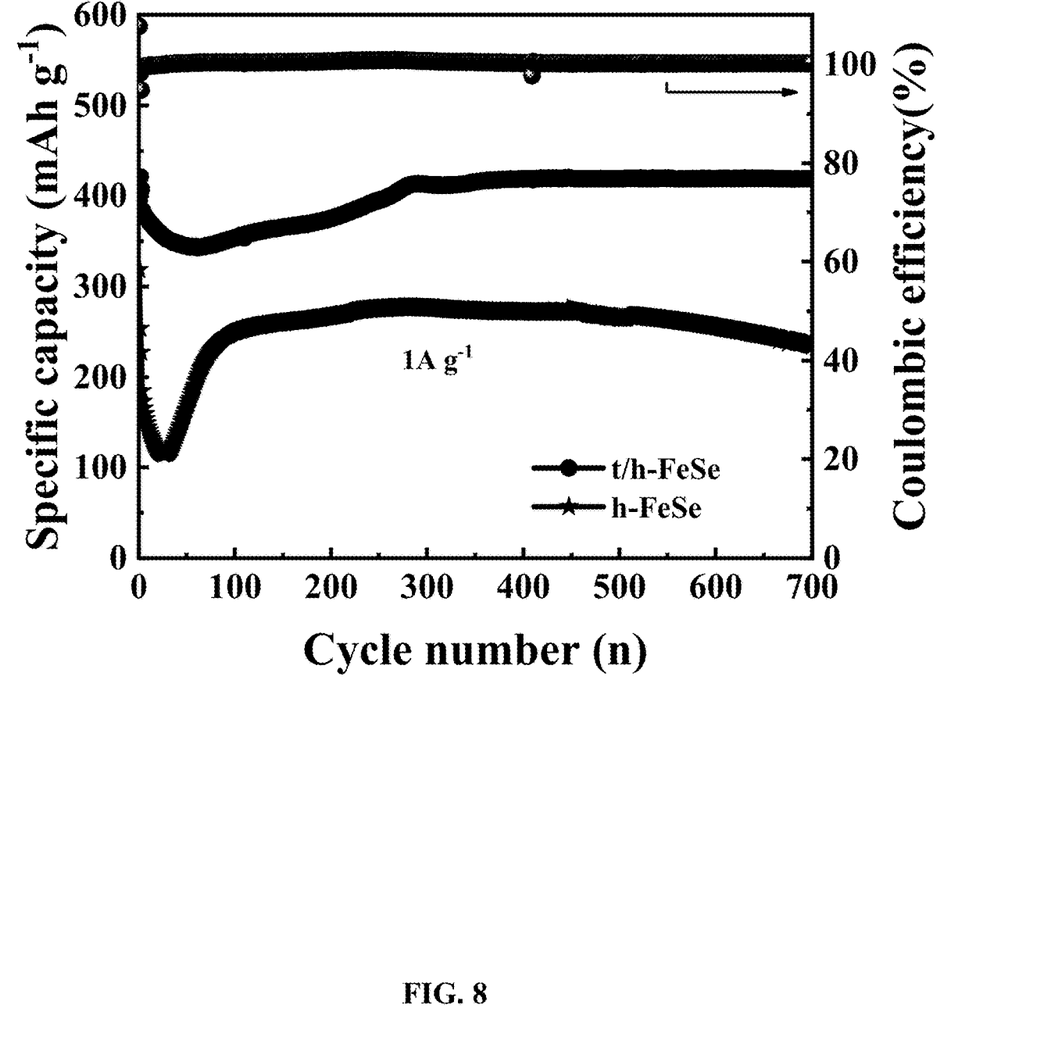
FIG. 8 is a battery cycle performance diagram of the sample prepared by Embodiment 3 and Comparative example 2 of the invention.

FIG. 8 is a battery cycle performance of the samples prepared by Embodiment 3 and Comparative example 2. It can be seen from the diagram that the sodium ion half-cell assembled by the sample prepared by Embodiment 3 can maintain a capacity of 419.0 mAh $g^{-1}$ after 500 cycles at a current density of 1 $Ag^{-1}$, showing excellent cycle stability. In contrast, the sodium ion battery prepared by Comparative example 2 has a capacity of only 248.6 mAh $g^{-1}$ after 500 cycles.

Figure 9:
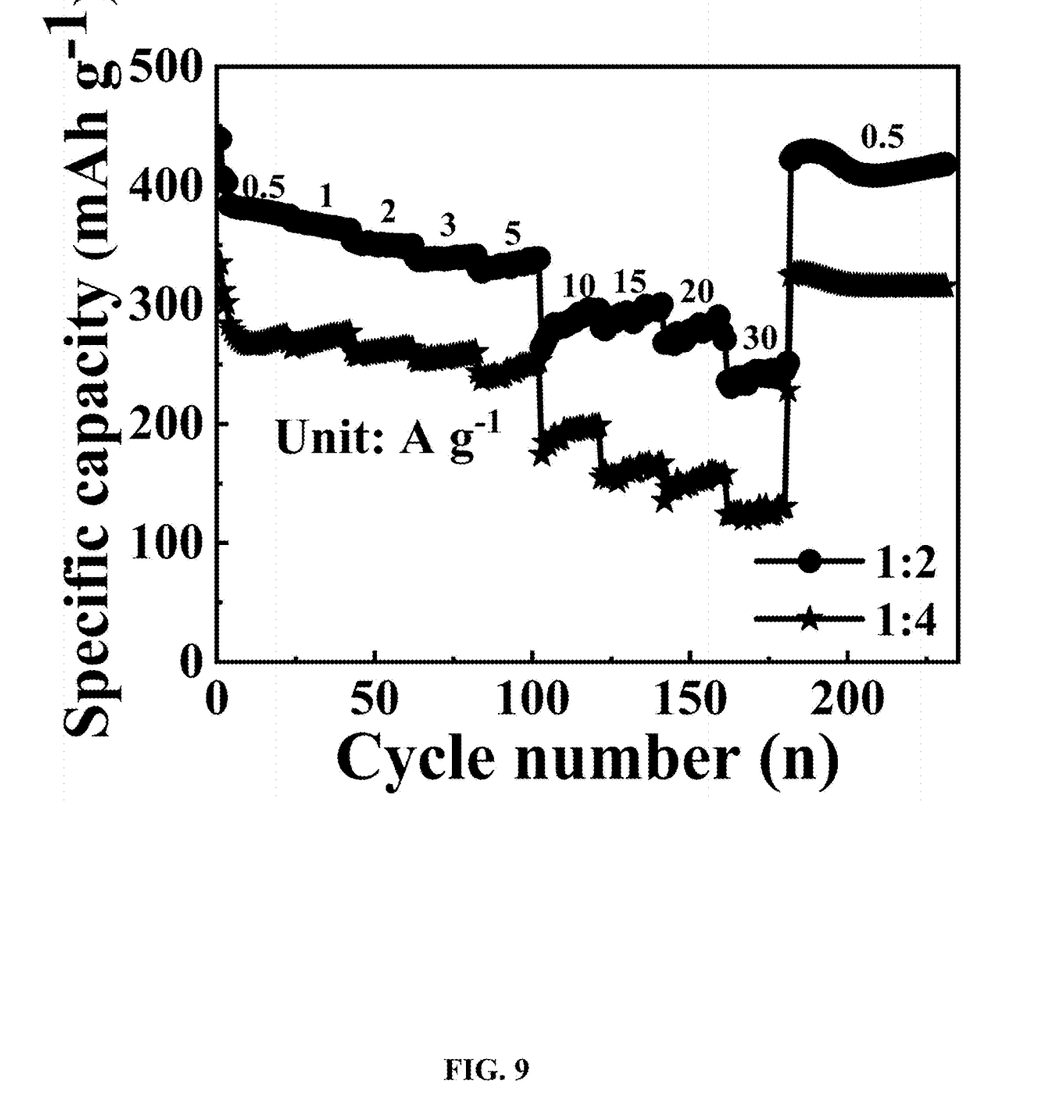
FIG. 9 is a rate performance diagram of the sample prepared by Embodiment 3 and Comparative example 2 of the invention.

FIG. 9 is a rate performance diagram of the samples prepared by embodiment 3 and Comparative example 2. It can be seen from the diagram that the sample prepared by Embodiment 3 shows good stability at different current densities. At a high rate of 20 A $g^{-1}$, the capacity can still reach 264.8 mAh $g^{-1}$, when the current density is restored to 0.5 A $g^{-1}$, the reversible capacity is still high. This performance is better than that of the sample of the comparative example, indicating that the presence of homologous heterostructure accelerates the diffusion kinetics and promotes the rate performance of the material.

Figure 10:
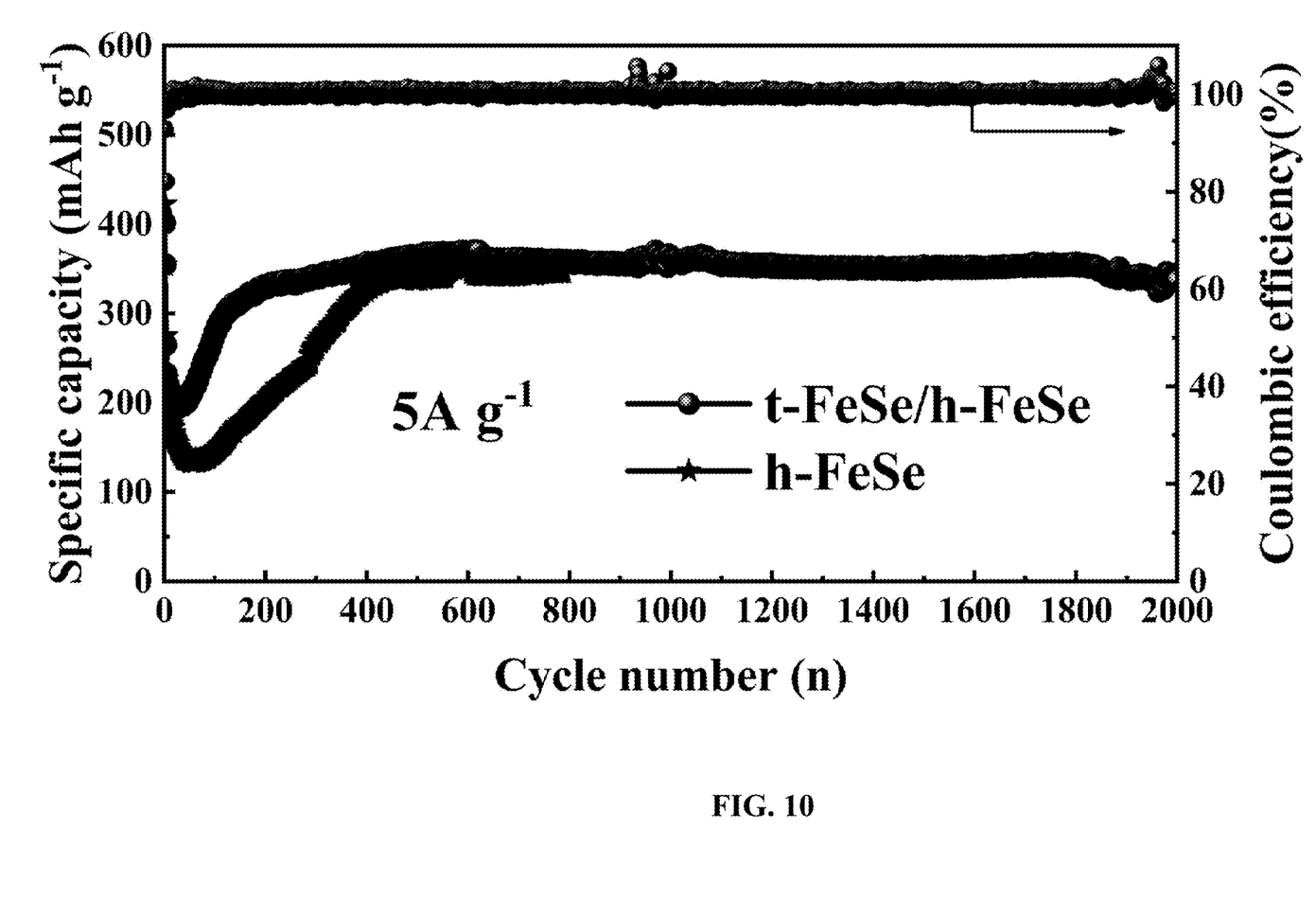
FIG. 10 is a long cycle performance test diagram of the sample prepared by Embodiment 3 of the invention at 5 A $g^{-1}$.

FIG. 10 is a long cycle performance test of the sample prepared by Embodiment 3 at 5 A g$^{-1}$, it can be seen from the diagram that the sample prepared by Embodiment 3 circulates 1500 times at a current density of 5 A g$^{-1}$, and the specific capacity is as high as 349.7 mAh g$^{-1}$, the capacity retention rate is 87.2%, and the capacity is higher than that of pure phase FeSe electrode material, indicating that the material with heterogeneous interface can significantly improve the capacity and long cycle stability of the battery.

The carbon-free homologous heterogeneous crystalline phase FeSe-based sodium storage electrode material prepared by the invention, the charge redistribution and lattice distortion at the heterogeneous phase boundary can improve the charge transfer efficiency, it provides a channel for metal ion transport, and also provide additional active sites for reversible redox reactions, accelerates the ion transport kinetics and ion storage capacity of the material, and then obtains excellent long-cycle performance and high-rate performance.

The above content is only used to explain the technical solution of the invention rather than the limitation, other modifications or equivalent substitutions made by ordinary technicians in this field to the technical solution of the invention should be covered in the claim scope of the invention as long as they are not divorced from the spirit and scope of the technical solution of the invention.

What is claimed is:

1. A preparation method for a homologous heterostructure FeSe electrode material with a high tap density, the method comprising the following steps:
    S1, mixing an iron powder and a selenium powder with an agate mortar, wherein a mass ratio of iron powder and selenium powder is 1-2:1-3, and obtaining a dark brown mixed powder;
    S2, placing the dark brown mixed powder in a tube furnace, and then carrying out calcination in a reducing atmosphere, wherein a calcination temperature is 700° C. and a holding time is 2 h, to obtain a FeSe material with a homologous heterostructure;
    wherein, the FeSe electrode material contains the homologous heterostructure composed of tetragonal crystal phase t-FeSe and hexagonal crystal phase h-FeSe;
    in S1, a particle size of the iron powder and the selenium powder after mixing with the agate mortar is 20-100 µm; and
    in S2, in a process of calcination, an initial temperature is 25° C. and a heating rate is 5° C./min.

2. A homologous heterostructure FeSe electrode material with the high tap density and the preparation method thereof according to claim 1, wherein in S2, the reducing atmosphere is $H_2$.

* * * * *